March 9, 1926.
C. D. STEWART
1,575,725
FLUID TEMPERATURE REGULATOR
Filed Oct. 19, 1921
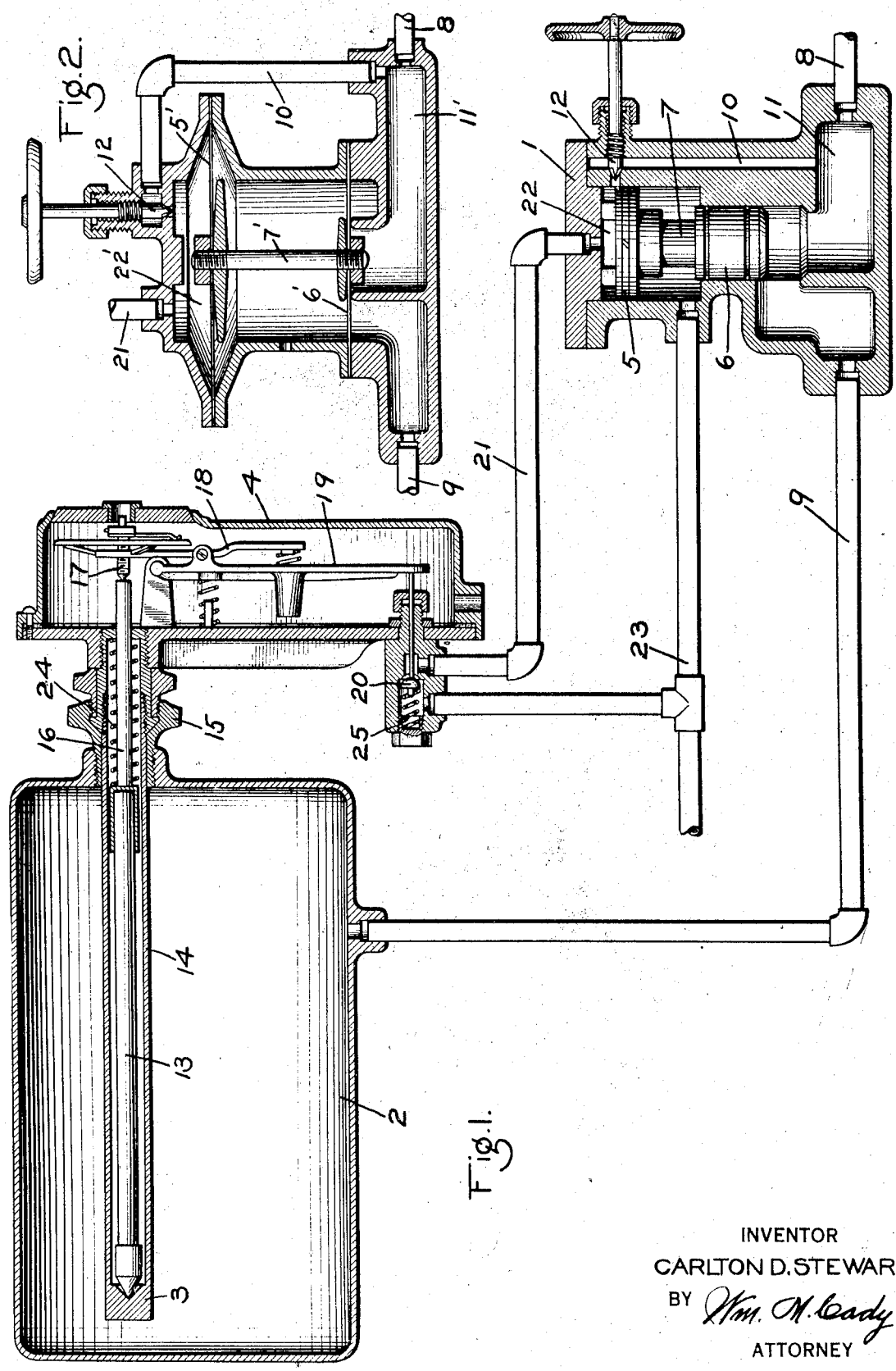
INVENTOR
CARLTON D. STEWART
BY *Wm. M. Cady*
ATTORNEY Patented Mar. 9, 1926.

1,575,725

UNITED STATES PATENT OFFICE.

CARLTON D. STEWART, OF BERKELEY, CALIFORNIA.

FLUID-TEMPERATURE REGULATOR.

Application filed October 19, 1921. Serial No. 508,843.

*To all whom it may concern:*

Be it known that I, CARLTON D. STEWART, a citizen of the United States, residing at Berkeley, in the county of Alameda and State of California, have invented new and useful Improvements in Fluid-Temperature Regulators, of which the following is a specification.

This invention relates to a device for automatically regulating and maintaining the temperature of heated fluid in a chamber.

The principal object of my invention is to provide an improved temperature regulating device of the above character.

In the accompanying drawing: Fig. 1 is a diagrammatic sectional view of a temperature regulating apparatus embodying my invention; and Fig. 2 a sectional view of a modified form of controlling valve device.

As shown in the drawing, the apparatus may comprise a controlling valve device 1 for controlling the supply of heated fluid under pressure, such as steam, to a container or receptacle 2, in which it is desired to maintain the contained fluid at a constant predetermined temperature. For controlling the operation of the valve device 1, a device capable of expanding and producing motion under the influence of the heated fluid in the receptacle 2 is provided, such as a thermostatic device 3 and operatively connected to the device 3 is a valve operating mechanism 4.

The valve device 1 may comprise a casing containing a differential piston having a large piston head 5 and a small piston head 6 connected by a stem 7, the head 6 being provided with a valve for controlling the supply of heated fluid from a supply pipe 8 to a pipe 9 which leads to the container 2.

A passage 10 leads from the supply chamber 11 to the space above the piston head 5 and communication through said passage is controlled by an adjustable cone shaped valve 12, so that the rate of flow to the piston chamber 11 may be regulated as desired.

The thermostatic device 3 may comprise a rod 13 composed of a material which remains substantially at a constant length regardless of the temperature and an enclosing tube 14 composed of a material having a very high coefficient of expansion. The thermostatic device extends into the receptacle 2 and the tube is secured at one end in the pipe fitting 15. One end of the rod 13 bears against the outer closed end of the tube 14 and the other end is mounted in a socket formed on the end of the rod 16.

The rod 16 extends into the casing of the operating mechanism 4 and engages an adjustable screw 17 carried by an arm 18 which is pivotally connected to a pivotally mounted lever 19. The free end of lever 19 engages the stem of a valve 20 for controlling communication from pipe 21 leading to piston chamber 22 to an atmospheric exhaust pipe 23, the exhaust pipe 23 being also connected to the chamber intermediate the piston heads 5 and 6.

In operation, heated fluid under pressure flows from supply pipe 8, past the open valve piston 6 to pipe 9 and into the container 2 and also through passage 10 past the valve 12 to piston chamber 22 and thence, if the valve 20 is open, through pipe 21 to exhaust pipe 23.

As the temperature in the container 2 rises through the supply of heated fluid thereto and approaches the desired temperature, according to the adjustment of the parts, the tube 14 of the thermostatic device expands, allowing the spring 24 to retract the rod 16 and allowing movement of the arm 18 and lever 19 by the spring 25, acting on the valve 20, so that said valve moves toward its seat.

As the valve 20 moves toward its seat the flow of fluid under pressure past the valve 20 is reduced, causing the pressure in piston chamber 22 to build up and as the area of piston head 5 is greater than the area of piston head 6, the differential piston will be forced downwardly against the pressure of fluid flowing past the valve piston 6. As the valve 20 moves toward its seat, the effective outlet port area is reduced and consequently the rate of flow of fluid pressure from piston chamber 22 through pipe 21 is reduced and therefore, since the rate of flow of fluid under pressure from passage 10 past the valve 12 remains constant, the pressure in chamber 22 will increase at a rate proportional to the extent that the valve 20 restricts the outlet port area. The increase in pressure in piston chamber 22 acts on the piston head 5 and tends to move the differential piston in a direction to reduce or close the port opening controlled by the valve 6 and thus the rate of flow of heated fluid from pipe 8 past the valve 6 to pipe 9 is regulated.

Should the closing movement of the valve piston 6 be such that the flow of heated fluid is not sufficient to maintain the predetermined temperature in the receptacle 2, the tube 14 will contract by reason of the reduced temperature, forcing the rod 13 and the rod 16 outwardly, so that the arm 18 and lever 19 are operated to move the valve 20 farther from its seat. As the valve 20 opens, the flow of fluid from the piston chamber 22 is increased so that the pressure therein is correspondingly reduced, permitting the pressure acting on the piston head 6 to move the differential piston farther from its seat and thereby admitting heated fluid under pressure to the receptacle 2 at a greater rate.

Where a certain flow of heated fluid is required to maintain the fluid in the container at a desired temperature, a balance is found by the thermostat, such that the correct amount of fluid is permitted to pass by the valve piston 6. Should the container at times require more fluid to maintain the desired temperature, the drop in temperature in the container will cause the thermostat to act so as to open the valve 20 to a greater extent, allowing the pressure in piston chamber 22 to drop and the differential piston to move so as to increase the flow opening made by the valve piston 6. Should less fluid be required, the thermostat will act to permit the valve 20 to restrict the flow opening and permit the pressure in piston chamber 22 to build up to a corresponding extent, thus forcing the differential piston toward its closed position so as to reduce the flow of heated fluid to the container.

In Fig. 2 of the drawing, a controlling valve device is shown, in which differential diaphragms are employed instead of the differential pistons as shown in Fig. 1. The operation being identical with that of the previously described controlling valve device, further description is deemed unnecessary.

Having now described my invention, what I claim as new and desire to secure by Letters Patent, is:—

1. A temperature regulating device comprising a receptacle for heated fluid, a source of heated fluid under pressure, a valve for controlling the supply of heated fluid from said source to said receptacle, a differential piston subject on one side to the pressure of heated fluid supplied to the receptacle and on the opposite side to the pressure of heated fluid supplied from said source through a restricted port for operating said valve, an exhaust valve for venting heated fluid from said differential piston, and means controlled by the temperature of heated fluid in said receptacle for operating said exhaust valve.

2. A temperature regulating device comprising a receptacle for heated fluid, a source of heated fluid under pressure, a valve for controlling the supply of heated fluid from said source to said receptacle, a differential piston for operating said valve having the smaller piston head subject to the flow of heated fluid to said receptacle and the larger piston head subject to the flow of heated fluid from said source through a restricted port, an exhaust valve for venting fluid from the larger piston head, and means subject to the temperature of heated fluid in said receptacle for operating said exhaust valve.

In testimony whereof I have hereunto set my hand.

CARLTON D. STEWART.